United States Patent
Arimatsu

(10) Patent No.: US 9,680,342 B2
(45) Date of Patent: Jun. 13, 2017

(54) MAGNET HOLDING MEMBER USED IN ROTATING ELECTRICAL MACHINE, ROTOR, ROTATING ELECTRICAL MACHINE, AND MACHINE TOOL

(71) Applicant: FANUC CORPORATION, Yamanashi (JP)

(72) Inventor: Yohei Arimatsu, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 66 days.

(21) Appl. No.: 14/879,209

(22) Filed: Oct. 9, 2015

(65) Prior Publication Data

US 2016/0111926 A1  Apr. 21, 2016

(30) Foreign Application Priority Data

Oct. 20, 2014  (JP) .................................. 2014-213629

(51) Int. Cl.
*H02K 1/27* (2006.01)
*H02K 1/28* (2006.01)

(52) U.S. Cl.
CPC .............. *H02K 1/278* (2013.01); *H02K 1/27* (2013.01); *H02K 1/2706* (2013.01); *H02K 1/28* (2013.01)

(58) Field of Classification Search
CPC  H02K 1/27; H02K 1/28; H02K 1/278; H02K 1/2706

(Continued)

(56) References Cited

U.S. PATENT DOCUMENTS

| | | | |
|---|---|---|---|
| H521 H * | 9/1988 | Fan ....................... | C08F 290/06 525/389 |
| 4,795,936 A * | 1/1989 | Crosetto ................ | H02K 1/278 310/156.31 |

(Continued)

FOREIGN PATENT DOCUMENTS

| JP | S61207162 A | 9/1986 |
|---|---|---|
| JP | H05308759 A | 11/1993 |

(Continued)

OTHER PUBLICATIONS

English Abstract and Machine Translation for Japanese Publication No. 11-089142 A, published Mar. 30, 1999, 15 pgs.

(Continued)

*Primary Examiner* — John K Kim
(74) *Attorney, Agent, or Firm* — Fredrikson & Bryon, P.A.

(57) ABSTRACT

A magnet holding member capable of increasing the rotating speed and improving or maintaining reliability of a rotating electrical machine, a rotor having the magnet holding member, a rotating electrical machine having the rotor, and a machine tool having the rotating electrical machine. When one section between one axial end and another axial end of the rotor is referred to as one traverse, the holding member has a cylindrical shape formed by spirally winding a fiber bundle, which is unbroken over at least one traverse, on the outer periphery of the rotor, from one axial end to the other axial end. The holding member is constituted by an FRP having a resin as a matrix, and a terminal treatment by using reactive curable resin is carried out on at least one of a winding start end and a winding terminal end of the fiber bundle.

12 Claims, 7 Drawing Sheets

(58) Field of Classification Search
USPC .................................... 310/156.28, 156.31
IPC .............................................. H02K 1/27, 1/28
See application file for complete search history.

(56) References Cited

U.S. PATENT DOCUMENTS

| | | | | |
|---|---|---|---|---|
| 6,242,833 | B1* | 6/2001 | Mobius ............... | H02K 15/03 310/156.01 |
| 6,920,682 | B2* | 7/2005 | Ku ....................... | H02K 1/278 29/596 |
| 6,940,196 | B2* | 9/2005 | Gysin ................... | H02K 1/278 310/152 |
| 2003/0222514 | A1* | 12/2003 | Van Dine ............. | H02K 15/03 310/43 |
| 2009/0146517 | A1* | 6/2009 | Tresch ................. | H02K 1/278 310/156.28 |
| 2010/0019602 | A1* | 1/2010 | Saban .................. | H02K 1/02 310/156.28 |
| 2010/0171383 | A1* | 7/2010 | Petrov ................. | H02K 1/02 310/156.28 |
| 2015/0180294 | A1* | 6/2015 | Vollrath .............. | H02K 1/278 310/156.21 |
| 2016/0111926 | A1* | 4/2016 | Arimatsu ............. | H02K 1/278 310/156.31 |

FOREIGN PATENT DOCUMENTS

| | | | |
|---|---|---|---|
| JP | H07020051 | U | 4/1995 |
| JP | H09131027 | A | 5/1997 |
| JP | 11-089142 | A | 3/1999 |
| JP | 2000245086 | A | 9/2000 |
| JP | 2002315241 | A | 10/2002 |

OTHER PUBLICATIONS

Abstract and Machine Translation for Japanese Publication No. 2002315241, published Oct. 25, 2002, 8 pages.
Abstract and Machine Translation for Japanese Publication No. S61207162, published Sep. 13, 1986, 4 pages.
Abstract and Machine Translation for Japanese Publication No. H09131027, published May 16, 1997, 11 pages.
Machine Translation for Japanese Publication No. H07020051, published Apr. 7, 1995, 6 pages.
Abstract and Machine Translation for Japanese Publication No. H05308759, published Nov. 19, 1993, 6 pages.
Untranslated Notification of Reasons for Refusal mailed by JPO, Feb. 9, 2016, 5 pages.
English machine translation of Notification of Reasons for Refusal mailed by JPO, Feb. 9, 2016, 2016, 4 pages.
Untranslated Decision to Grant a Patent mailed by JPO, Jul. 5, 2016, 3 pages.
English machine translation of Decision to Grant a Patent mailed by JPO, Jul. 5, 2016, 3 pages.
English Abstract and Machine Translation for Japanese Publication No. 2000-245086, published Sep. 8, 2000, 8 pgs.

* cited by examiner

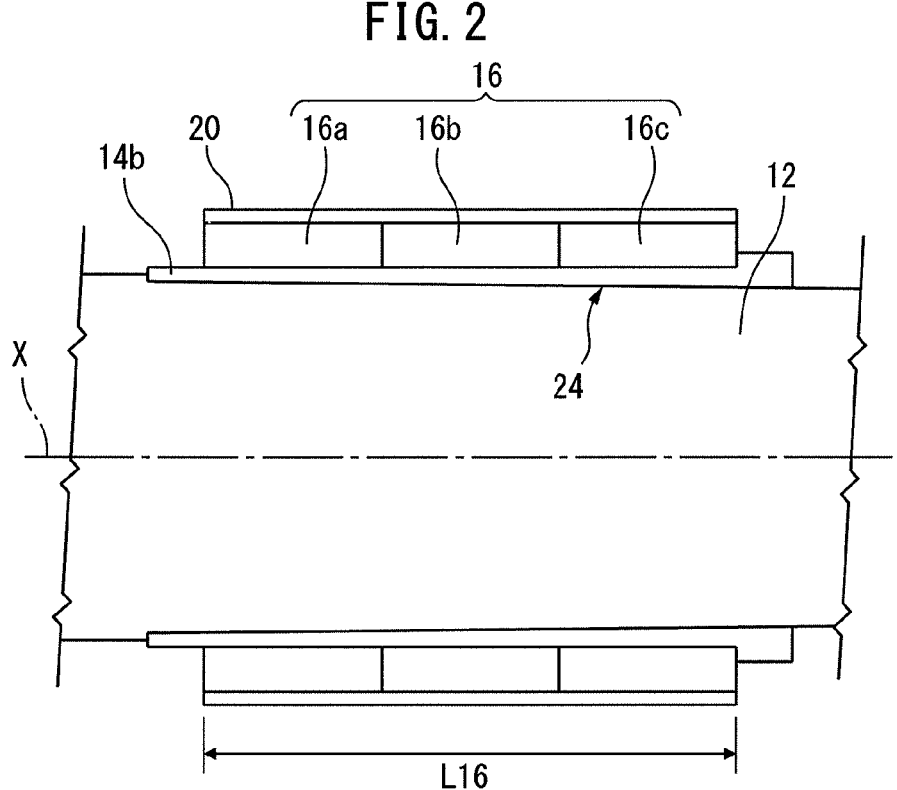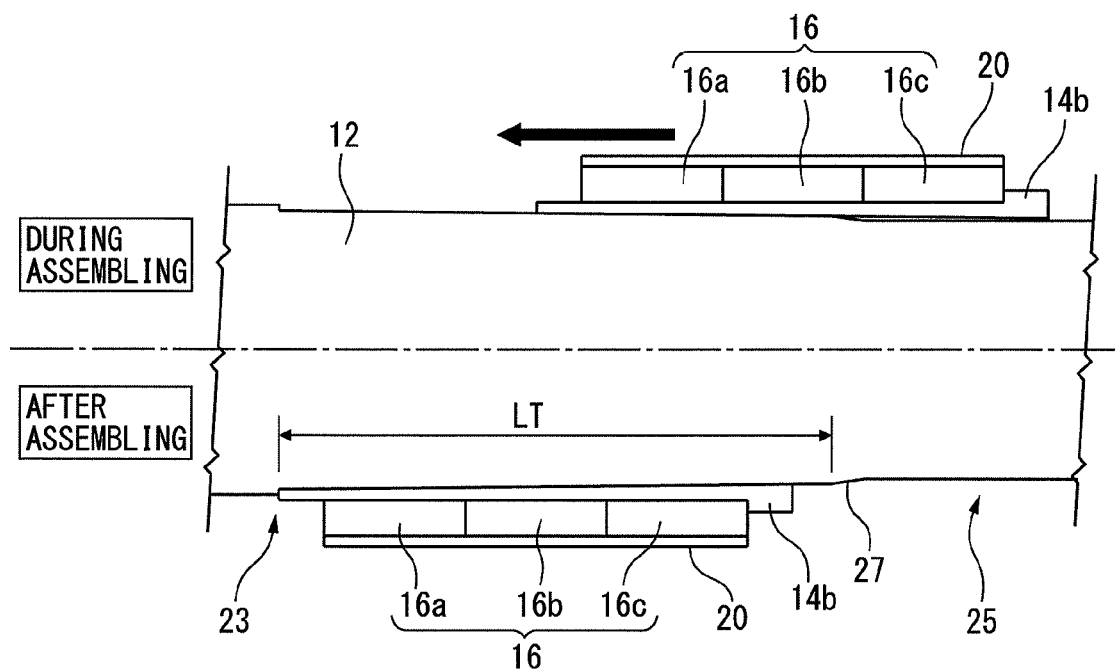

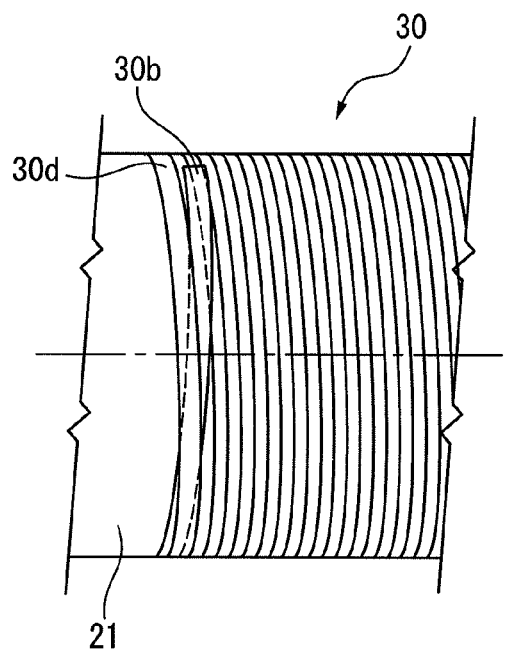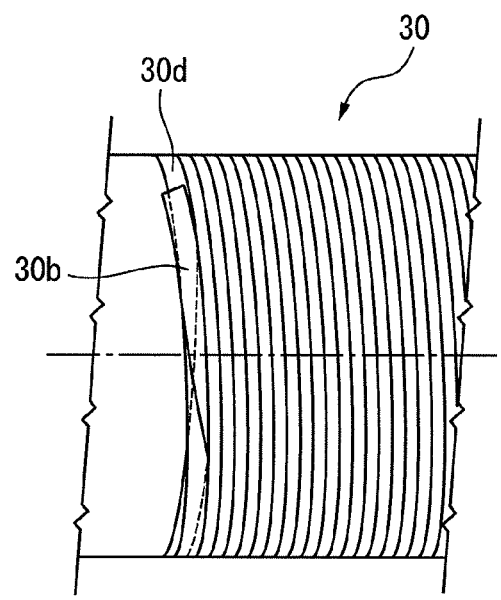
FIG. 8a
FIG. 8b

MAGNET HOLDING MEMBER USED IN ROTATING ELECTRICAL MACHINE, ROTOR, ROTATING ELECTRICAL MACHINE, AND MACHINE TOOL

BACKGROUND OF THE INVENTION

1. Field of the Invention

The present invention relates to a magnet holding member used in a rotating electrical machine, a rotor having the magnet holding member, a rotating electrical machine having the rotor, and a machine tool having the rotating electrical machine.

2. Description of the Related Art

A synchronous electric motor including a stator having a plurality of magnets is well known, in which the magnets are positioned on a surface of the rotor in the circumferential direction thereof. In such a synchronous electric motor, when the rotating speed of the rotor needs to be increased, it is necessary to increase the holding strength for the magnets on the stator, in order to prevent the magnets from being separated from the stator due to centrifugal force.

As a relevant prior art document, for example, JP H11-089142 A discloses a rotor of an electric motor, including a rotating shaft, a sleeve positioned on an outer surface of the rotating shaft, a permanent magnet having a cylindrical shape positioned on an outer surface of the sleeve, and a holding member made from carbon fiber reinforced plastic (CFRP), positioned on an outer surface of the permanent magnet.

In order to rotate the rotor at high speed, it is necessary that the holding member of the magnet have high strength. For example, when a holding member made from CFRP is used as described in JP H11-089142 A, the holding strength can be increased by increasing tension in the circumferential direction of the holding member. However, actually, a fiber of the holding member may be loosened when producing the holding member or an outer fiber layer may peel away from an inner fiber layer in the holding member. Therefore, it is difficult to increase the holding strength by increasing the tension.

The loosening of the fiber and/or the peeling of the fiber layer may occur, for example, when an FRP, formed by winding a sheet-like material on a cylindrical jig, is used as the holding member. Concretely, a terminal end and a vicinity portion of the wound sheet material cannot be sufficiently extended corresponding to the applied tension, and the outer layer may be separated from the inner layer, whereby the reliability of the rotor may be deteriorated. Such a problem is likely to occur in the terminal end of the wound sheet material. In addition, when large restoring force occurs in the holding member due to a large tightening margin of the holding member, the fiber of the outer layer may be loosened by entering between the fibers of the inner layer, whereby the required holding strength cannot be obtained.

Therefore, a reliable holding member is required, in which the start end and the terminal end of the wound sheet do not peel away, and the fiber of the outer layer does not enter between the fibers of the inner layer, even when the high holding strength of the holding member is required.

SUMMARY OF THE INVENTION

The object of the present invention is to provide a magnet holding member capable of increasing the rotating speed and improving or maintaining reliability of a rotating electrical machine, a rotor having the magnet holding member, a rotating electrical machine having the rotor, and a machine tool having the rotating electrical machine.

One aspect of the present invention provides a holding member used in a rotating electrical machine having a rotor and a plurality of magnets positioned on an outer peripheral surface of the rotor, the holding member being positioned radially outside of the magnets and configured to radially inwardly press and hold the magnets, wherein the holding member comprises a cylindrical shape formed by spirally winding a fiber bundle on the outer periphery of the magnet, which is unbroken over at least one traverse, from one axial end to the other axial end of the rotor outside the outer periphery of the rotor, the one traverse at least including a section where the magnets are positioned, among sections between the one axial end the other axial end of the rotor, and wherein the holding member is formed by a fiber reinforced resin including a resin as a matrix, and a termination treatment of at least a winding start end and a winding terminal end of the fiber bundle is carried out by using a first resin which is a reactive curable resin.

In a preferred embodiment, the holding member is formed by carrying out a plurality of winding operations, each winding operation winding the fiber bundle corresponding to the one traverse.

In a preferred embodiment, the winding start end and the winding terminal end of the unbroken fiber bundle are positioned on the same side of the rotor in an axial direction thereof, and the termination treatment of the start end and the terminal end is carried out by adhering the start end and the terminal end by using the first resin.

In a preferred embodiment, the fiber bundle is formed as a flat tape.

In a preferred embodiment, the first resin is an epoxy resin.

In a preferred embodiment, a second resin different from the first resin is used in a section between a terminal treatment part of the winding start end and a terminal treatment part of the winding terminal end.

In this case, it is preferable that a glass-translation temperature of the second resin be lower than a glass-translation temperature of the first resin. It is preferable that tensile shear adhesive strength of the second resin, obtained when the fiber bundles are adhered to each other by the second resin, be lower than that of the first resin. It is preferable that Izod impact strength of the second resin be higher than Izod impact strength of the first resin or the Izod impact strength of the second resin be unmeasurable since the second resin is not destroyed in an Izod impact test. Further, it is preferable that the second resin be an acrylic resin.

In a preferred embodiment, the fiber bundle includes a carbon fiber.

Another aspect of the present invention provide a rotor comprising the holding member of the invention, wherein tension is applied to the holding member in a circumferential direction of the rotor, and radially-inward elastic compressive force is applied to the magnets due to the tension.

In a preferred embodiment, a separate member having a cylindrical shape is positioned on the outer periphery of the holding member in a concentric pattern, wherein tension is applied to the separate member in a circumferential direction of the separate member, and radially-inward elastic compressive force is applied to the holding member due to the tension applied to the separate member.

Still another aspect of the present invention provides a rotating electrical machine comprising the rotor of the invention.

Still another aspect of the present invention provides a machine tool comprising the rotating electrical machine of the invention.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 2 is a view showing a sleeve having a different shape from a sleeve of the electrical motor of FIG. 1;

FIG. 3 is a view explaining an operation for positioning permanent magnets at predetermined positions on a rotor by using the sleeve of FIG. 2;

FIGS. 8a and 8b show an example of a terminal treatment of a winding terminal end of a fiber bundle constituting the magnet holding member;

DETAILED DESCRIPTION

Hereinafter, a preferred embodiment of the present invention will be explained, with reference to the drawings. A reduction scale of the illustrated embodiment is properly changed, in order to facilitate understanding of the invention.

Figure 1:
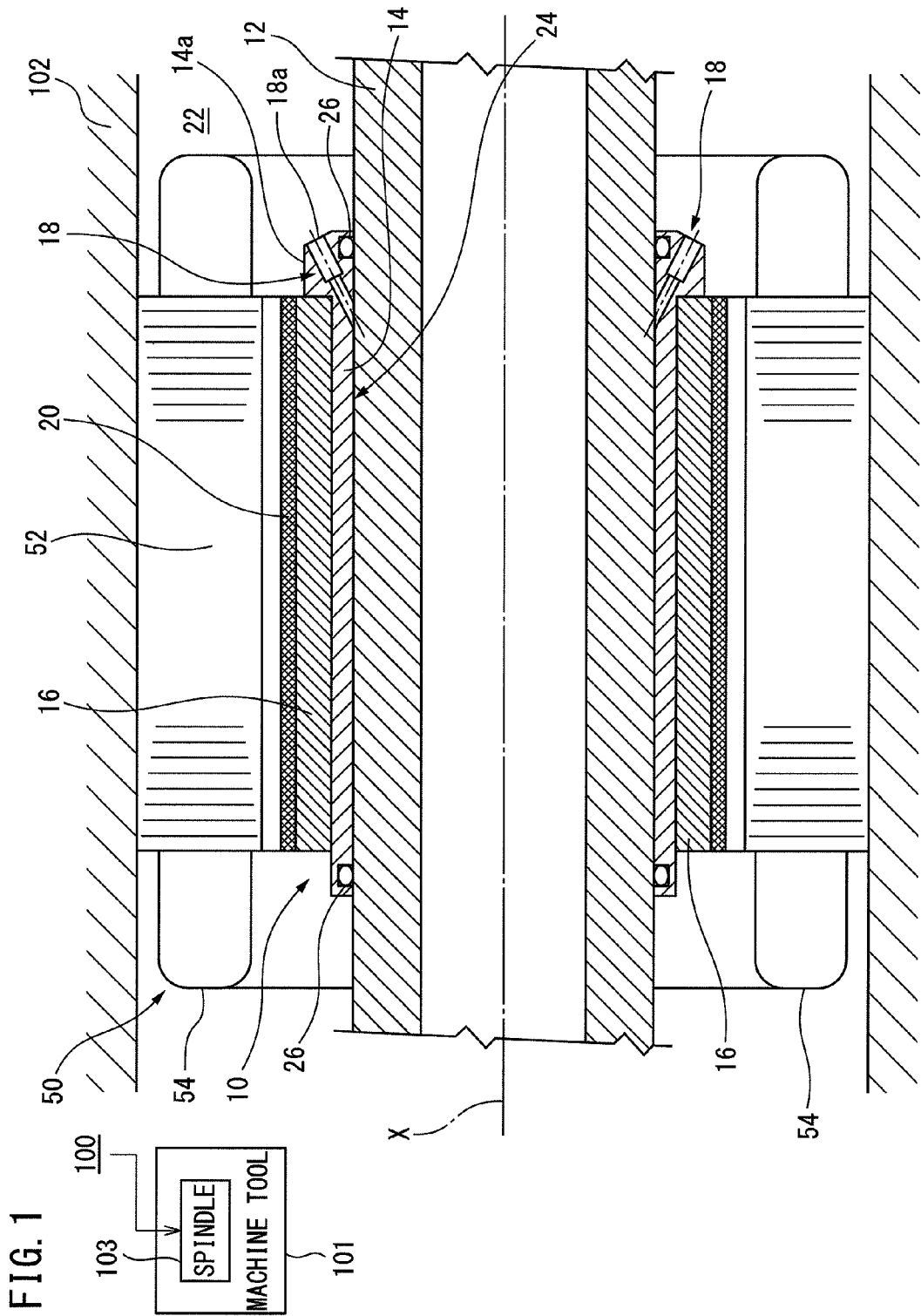
FIG. 1 is a view showing a schematic configuration of an electrical motor according to an embodiment of the present invention.

FIG. 1 is a schematic longitudinal sectional view of a permanent magnet electrical motor (or a rotating electrical machine) 100 according to an embodiment of the present invention. For example, electrical motor 100 is a surface magnet type (SPM) electrical motor, in which a plurality of permanent magnets are attached to a surface of a rotor of the motor. Electrical motor 100 has a rotor 10 and a stator 50 positioned in a concentric pattern. Electrical motor 100 is configured to generate a rotative power due to magnetic interaction between rotor 10 and stator 50.

Stator 50 has a cylindrical iron core 52 in which a slot (not shown) extending parallel to an axial direction is formed, and a coil 54 wound on iron core 52 through the slot. Stator 50 is fixed to a housing 102 of motor 100 which encloses stator 50. When electrical motor 100 is operated, three-phase AC current is supplied to coil 54, for example, and a rotating magnetic field is generated around rotor 10.

Rotor 10 has a sleeve 14 fitted with an outer periphery of a cylindrical rotating shaft 12 connected to a spindle of a machine tool, by interference fit, for example; a plurality of permanent magnets 16 positioned on an outer peripheral surface of sleeve 14 in the circumferential direction thereof, each magnet having a partial cylindrical shape formed by dividing a cylindrical shape in the circumferential direction thereof; and a magnet holding member 20 attached to an outer periphery of magnet 16 so as to hold magnet 16. Rotating shaft 12 is supported by a bearing (not shown) so as to rotate about a rotation axis X when electrical motor 100 is operated. Sleeve 14, magnets 16 and holding member 20 are configured to rotate integrally with rotating shaft 12.

In the example of FIG. 1, at one end (a right end in the drawing) of sleeve 14, a flange 14a radially outwardly protruding in a stepwise manner is formed. A fluid path 18 is formed in flange 14a, which fluidly communicates an external space 22 of rotor 10 and a boundary surface 24 between an inner peripheral surface of sleeve 14 and an outer peripheral surface of rotating shaft 12. In fluid path 18, a screw hole 18a is formed which opens toward external space 22. Annular grooves are formed at both axial ends of sleeve 14, and a seal member 26 such as an O-ring is positioned in each annular groove.

Herein, the expression "radially outward" refers to a direction away from rotation axis X in the transverse section, and the expression "radially inward" refers to a direction toward rotation axis X in the transverse section. Further, the expression "a direction of axis" or "an axial direction" refers to a direction parallel to rotation axis X.

In this embodiment, rotor 10 is attached to rotating shaft 12 by hydraulic pressure fit. In other words, the diameter of rotor 10 is increased by hydraulic pressure supplied to boundary surface 24 between sleeve 14 and rotating shaft 12 through fluid paths 18 which are formed in the circumferential direction of sleeve 14 at predetermined intervals. At this point, supply nozzles (not shown) are inserted into screw holes 18 for supplying oil in fluid paths 18. In this regard, at least one fluid path 18 may be used to vent air.

The oil, supplied to boundary surface 24, is sealed by seal members 26 positioned at the both ends of sleeve 14, so as to not leak to external space 22 of rotor 10. The oil acts as lubricant between the inner peripheral surface of sleeve 14 and the outer peripheral surface of rotating shaft 12. By virtue of this, sleeve 14 can be easily slidably moved in the axial direction to a predetermined position relative to rotating shaft 12.

FIG. 2 shows a sleeve 14b having the different shape from sleeve 147 of FIG. 1. An inner peripheral surface of sleeve 14b is formed as a tapered surface, in which the diameter thereof is gradually decreased from one axial end to another axial end. At least a section of the outer peripheral surface of rotating shaft 12, to which sleeve 14b is fixed, is formed as a tapered surface which inclines in the same direction as the inner peripheral surface of sleeve 14b. In this case, as shown in an upper part of FIG. 3, sleeve 14 is moved relative to rotating shaft 12 from the small-diameter side to the large diameter-side (from the right side to the left side in the drawing). In this regard, the dimensions of sleeve 14b and rotating shaft 12 are determined so that a predetermined tightening margin is obtained when sleeve 14b reaches a predetermine position (as shown in a lower part of FIG. 3). In this case, it is not necessary to arrange fluid path 18, and boundary surface between rotating shaft 12 and sleeve 14b is formed as a tapered surface.

In other words, the tightening margin is zero in the position as shown in the upper part of FIG. 3. As sleeve 14b is moved (pressed) to the left side in the axial direction from the state of the upper part of FIG. 3, sleeve 14b is radially and outwardly expanded. Then, when the press-fitting of sleeve 14b is completed (the lower part of FIG. 3), the diameter of sleeve 14b is expanded. As a result, tension is generated in holding member 20 in the circumferential direction thereof, and magnets 16 are strongly held and pressed against the outer peripheral surface of sleeve 14b, due to elastic restoring force by holding member 20 for radially and inwardly pressing magnets 16. Therefore, in the example of FIG. 3, it is not necessary to expand the diameter of holding member 20 by hydraulic pressure, instead the diameter of holding member 20 is expanded by sliding along the tapered surface.

Similarly to permanent magnets 16 of FIG. 1, a plurality of permanent magnets are positioned on the outer peripheral surface of sleeve 14b in the circumferential direction thereof, and each magnet may have a partially cylindrical shape. Further, permanent magnet 16 can be divided in the axial direction, so that permanent magnets 16a, 16b and 16c are aligned in a row, as shown in FIG. 2.

As explained below, holding member 20 is constituted by a cylindrical member formed by winding a fiber bundle having a constant width. Holding member 20 may be formed by directly winding the fiber bundle on the outer peripheral surface of the magnet, or may be previously formed as the cylindrical shape and attached to the outer periphery of the magnet after that.

The diameter of holding member 20 is expanded so as to have a predetermined tightening margin regarding the fitting with permanent magnet 16. By virtue of this, holding member 20 has potential tension or restoring force in the circumferential direction thereof, and sufficient force is generated in the radially-inward direction for holding magnets 16 against centrifugal force generated by the rotation of rotor 10. The high the rotation speed of the rotor is the higher holding strength (i.e., the higher tension) is necessary. The larger the tightening margin of holding member 20 is the higher tension is obtained. Therefore, it is necessary that holding member 20 generates the tension corresponding to the required holding strength according to the rotating speed of the rotor, and thus the necessary tightening margin is determined for generating the tension.

Next, a detail of the structure of holding member 20 is explained. Holding member 20 is constituted by a fiber reinforced plastic (hereinafter, referred to as an "FRP"), in which a bundle of fibers (or a fiber bundle) is integrally formed with a matrix resin. The fiber bundle and the matrix resin may be integrated at any timing in a process for forming holding member 20 on the outer periphery of the magnet, as long as the integration is carried out before holding member 20 generates the tension.

For example, a prepreg fiber bundle may be prepared, in which the matrix resin is impregnated in the fiber bundle. A cylindrical member is formed by winding the prepreg fiber bundle on a forming jig, the jig is removed or withdrawn from the fiber bundle after the resin is cured. Then, holding member 20 is formed by the cylindrical member by fitting with the outer periphery of the magnet. Otherwise, holding member 20 may be formed by directly winding the prepreg fiber bundle on the periphery of the magnet and curing the resin.

Alternatively, a fiber bundle may be wound on the forming jig while applying the matrix resin on the fiber bundle, so that the fiber bundle is integrally formed with the matrix resin. After the resin is cured, the cylindrical member may be formed by removing the jig, and the cylindrical member may be fitted with the outer periphery of the magnet. Otherwise, a fiber bundle may be directly wound on the outer periphery of the magnet while applying the matrix resin on the fiber bundle, so that the fiber bundle is integrally formed with the matrix resin. In this case, holding member 20 is formed on the outer periphery of the magnet by curing the resin on the outer periphery of the magnet.

Alternatively, the fiber bundle and the matrix resin may be integrated by impregnating the resin in the fiber by vacuum impregnating, after winding the fiber bundle on the forming jig. The cylindrical member may be formed by removing the jig after the resin is cured, and the cylindrical member may be fitted with the outer periphery of the magnet. Otherwise, the fiber bundle and the matrix resin may be integrated by impregnating the resin in the fiber by vacuum impregnating, after directly winding the fiber bundle on the outer peripheral of the magnet of the rotor. In this case, holding member 20 is formed on the outer periphery of the magnet by curing the resin on the outer periphery of the magnet.

As indicated by reference numeral 23 in the lower part of FIG. 3, a stepped portion (or abutment portion 23) may be formed on the outer peripheral surface of rotating shaft 12 so as to facilitate positioning of sleeve 14b. A region 25 of rotating shaft 12 is separated from stepped portion 23 by a length LT of a tapered section, and the diameter of region 25, provided with a tapered portion 27, is determined so that region 25 does not interfere with a portion of the sleeve having the smallest diameter (i.e., the diameter of region 25 is smaller than the smallest diameter of the sleeve).

As the fiber of the FRP used to form holding member 20, for example, a carbon fiber, a glass fiber, an aramid fiber, a silicon carbide fiber, a boron fiber, a titanium alloy fiber, an ultrahigh molecular weight polyethylene fiber or a polybutylene terephthalate fiber (i.e., a material having a high specific strength (or tensile strength per unit density)) is preferable. In particular, it is preferable that a molecular structure of the surface of the fiber have a functional group such as —CO—, C=O, or COOH.

Next, preferred examples of a winding manner of the fiber bundle for forming holding member 20 will be explained. Herein, one section at least including a section where the permanent magnet are positioned (hereinafter, also referred to as a "magnet section," as shown by section L16 in FIG. 2), among sections between the one axial end and the other axial end of the rotor, is referred to as one traverse (as shown by section L20 in FIG. 4). In this case, in order to form holding member 20, a fiber bundle, which is continuous or unbroken over at least one traverse (L20), is used. In other words, the fiber bundle is continuously and spirally wound on the outer periphery of the rotor or the forming jig, from one axial end to the other axial end of thereof.

Holding member 20 is configured to generate the tension for holding the magnet, after being arranged on the outer periphery of the magnet and when being fixed to the rotating shaft. Therefore, it is necessary that (the fiber bundle of) holding member 20 is not loosened by the tension, in particular, it is necessary that a winding start end and a winding terminal end of the fiber bundle are assuredly processed or treated so as to not loosened. In other words, when the start end and the terminal end are assuredly tightened, the section between the ends is not loosened. Therefore, a process or treatment for tightening the start end and the terminal end is important.

Figure 4:
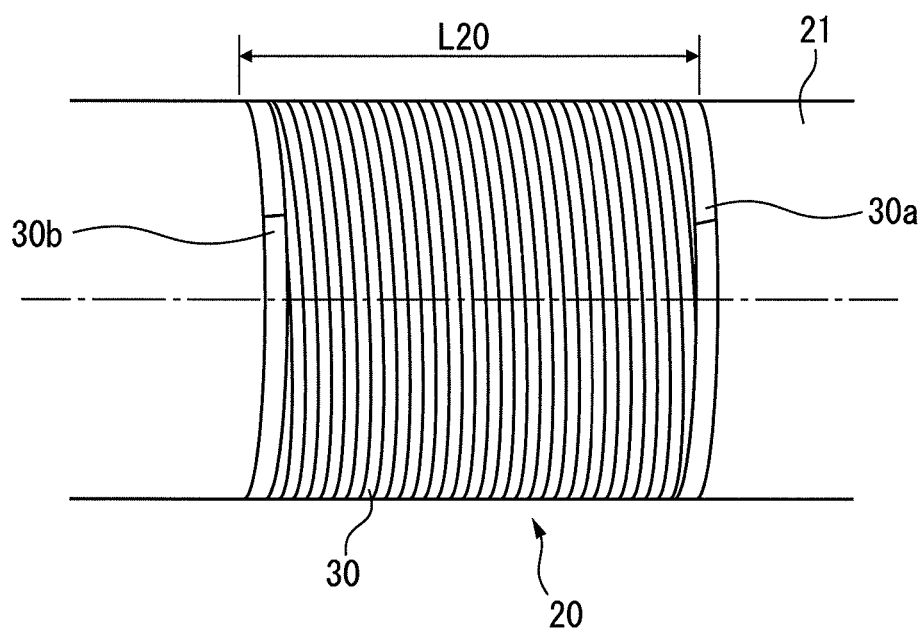
FIG. 4 shows a configuration example of a magnet holding member of the present invention.

FIG. 4 shows an example of a method for forming holding member 20 by winding fiber bundle 30 on the outer periphery of forming jig 21 having a cylindrical or column shape. By the similar method, the fiber bundle may be directly wound on the outer periphery of magnet 16 so as to directly form holding member 20 on permanent magnet 16. Fiber bundle 30 has winding start end 30a at one end of traverse section L20, and winding terminal end 30b at the other end of traverse section L20. Winding start end 30a is withdrawn from an inner side to an outer side of the winding, is wound on the same periphery (or the same axial position) by at least one lap, so as to form an overlapped portion where winding start end 30a and a portion before one lap of fiber bundle 30 are overlapped with each other. Then, the start end and the portion before one lap of the overlapped portion are bonded and fixed by using a first resin (hereinafter, also referred to as a resin "A") (concretely, by applying resin "A" to the overlapped portion and curing the resin), whereby a fixing process (or a termination treatment) of winding start end 30a is completed. In this regard, resin "A" is a reactive curable resin, and may be cured by being heated.

On the other hand, after the fiber bundle is spirally wound from one end to the other end of traverse section L20, winding terminal end 30b is wound on the same periphery (or the same axial position) by at least one lap, so as to form an overlapped portion where winding terminal end 30b and a portion before one lap of fiber bundle 30 are overlapped with each other. Then, the terminal end and the portion before one lap of the overlapped portion are bonded and fixed by using resin "A" (concretely, by applying resin "A" to the overlapped portion and curing the resin), whereby a fixing process (or a termination treatment) of winding terminal end 30b is completed. In this regard, the length of traverse section L20 is equal to or longer than the length of magnet section L16 (FIG. 2). It is preferable that the overlapped portions regarding start end 30a and terminal end 30b be formed by winding the fiber bundle on the same axial position by one or more lap, and that the bonded area be wider than one lap.

At the overlapped portion, the end of the fiber bundle may be overlapped on the former lap, or may be introduced under the former lap. In the latter case, since both sides of the end of the fiber bundle can be bonded to the other portion of the fiber bundle, the end of the fiber bundle can be strongly fixed. As resin "A," a resin, capable of making a chemical linkage by reacting with a functional group on the surface of the fiber during being cured, is particularly preferable. For example, epoxy resin (concretely, a resin having an epoxy group) is preferable.

In order to equalize the holding strength of holding member 20 in the axial direction as possible, it is preferable that the above bonding process be carried out at the start and end points or in the vicinity of the points of traverse section L20.

Figure 5:
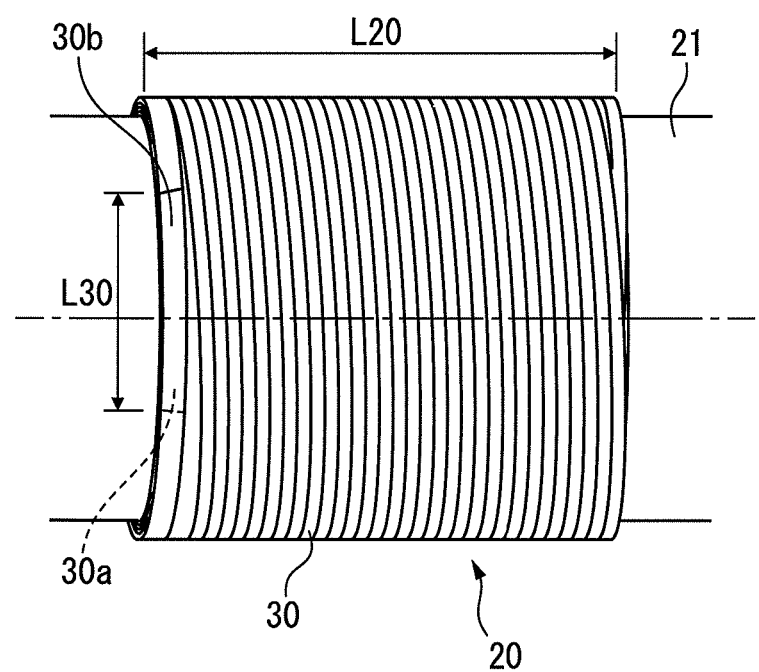
FIG. 5 shows another configuration example of a magnet holding member of the present invention.

FIG. 5 shows another example of a method for forming holding member 20 by winding fiber bundle 30 on the outer periphery of forming jig 21. By the similar method, the fiber bundle may be directly wound on the outer periphery of magnet 16 so as to directly form holding member 20 on permanent magnet 16. In the example of FIG. 5, fiber bundle 30 is spirally wound from one end (the left end in the drawing) to the other end (the right end in the drawing) of traverse section L20, over the axial length corresponding to one traverse, and then, fiber bundle 30 is wound from the other end to the one end (i.e., a winding operation of one traverse is repeated several times). By virtue of this, the radial thickness of holding member can be increased, and the holding strength for the magnets can be increased.

The terminal treatment of winding start end and the winding terminal end of fiber bundle 30 may be carried out every traverse. However, it is preferable that the winding operation be repeated several times by continuously using the fiber bundle without cutting it, whereby the number of portions where the terminal treatment is carried out may be minimized. The purpose therefor is to improve work efficiency and finished size accuracy, since the outline dimension of the portion where the terminal treatment is carried out is unstable.

In the example of FIG. 5, winding start end 30a and winding terminal end 30b are positioned at the same side (the left side in the drawing), and the terminal treatment for preventing fiber bundle 30 from loosening is carried out. Concretely, winding start end 30a and winding terminal end 30b are overlapped on the same periphery so as to form an overlapped portion (or a section L30), and the ends are bonded to each other by using resin "A" at the overlapped portion. It is preferable that the both ends be overlapped on the same axial position by one or more lap, and that the bonded area be wider than one lap.

In the example of FIG. 5, after the winding operation of one traverse is carried out several times, the terminal treatment is carried out at the same end. However, as shown in FIG. 4, winding start end 30a and winding terminal end 30b may be positioned at the different ends, and the terminal treatment may be separately carried out at each end. In this regard, since winding start end 30a is positioned at the innermost layer of fiber bundle 30, start end 30a may be previously withdrawn, and introduced outside along an axial end surface of the fiber bundle.

Figure 6C:
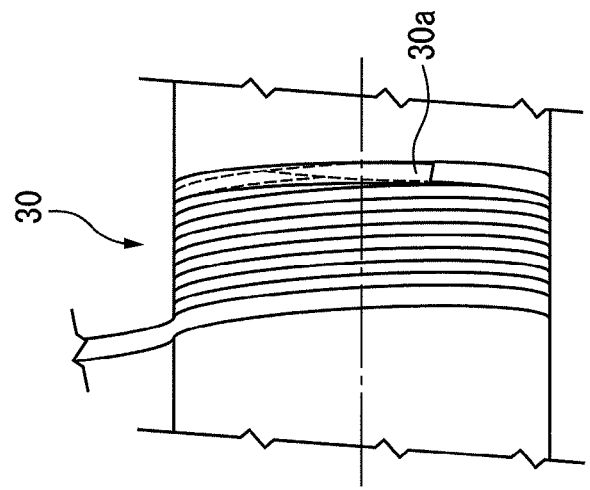
FIGS. 6a to 6c show an example of a terminal treatment of a winding start end of a fiber bundle constituting the magnet holding member.
Figure 6B:
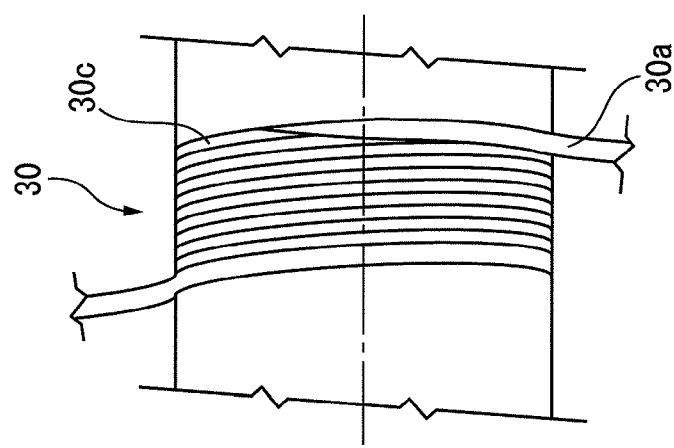
Figure 6A:
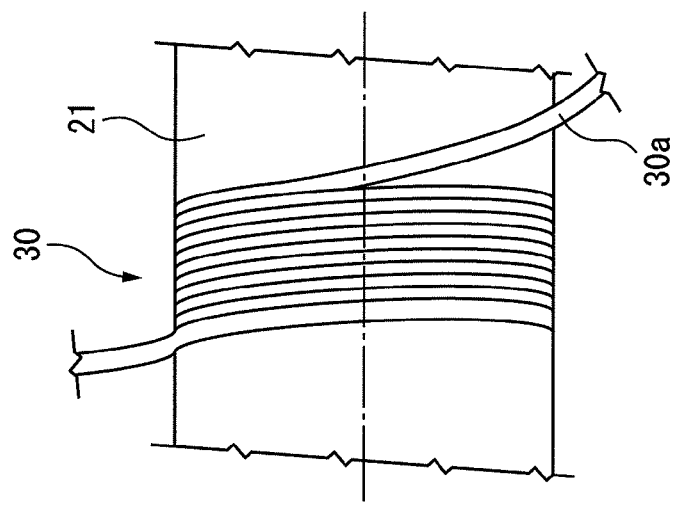

FIGS. 6a to 6c explain in detail an example of the terminal treatment for the winding start end of fiber bundle 30. The winding start end of fiber bundle may enter the innermost layer of the fiber bundle as the winding operation is carried out. Therefore, as shown in FIG. 6a, a portion 30a having certain length, which is not wound on forming jig 21, is previously withdrawn from the fiber bundle.

Next, as shown in FIG. 6b, withdrawn portion 30a of the fiber bundle is folded along a previously wound axial edge portion 30c of fiber bundle 30 so that portion 30a is overlapped with edge portion 30c. Then, withdrawn portion 30a is wound on edge portion 30c at the same axial position by one or more lap so as to form an overlapped portion, and the portions are bonded by using resin "A" at the overlapped portion. By the similar method, holding member 20 may be directly formed on permanent magnet 16.

Figure 7C:
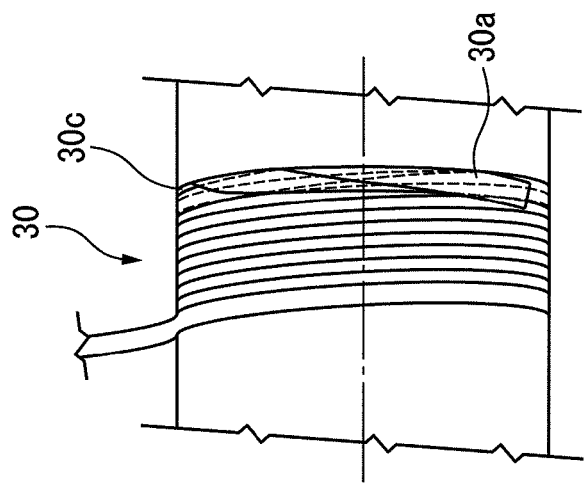
FIGS. 7a to 7c show another example of a terminal treatment of a winding start end of a fiber bundle constituting the magnet holding member.
Figure 7B:
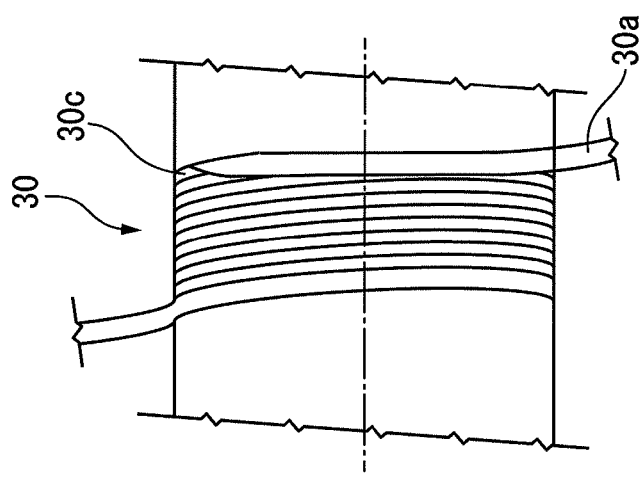
Figure 7A:
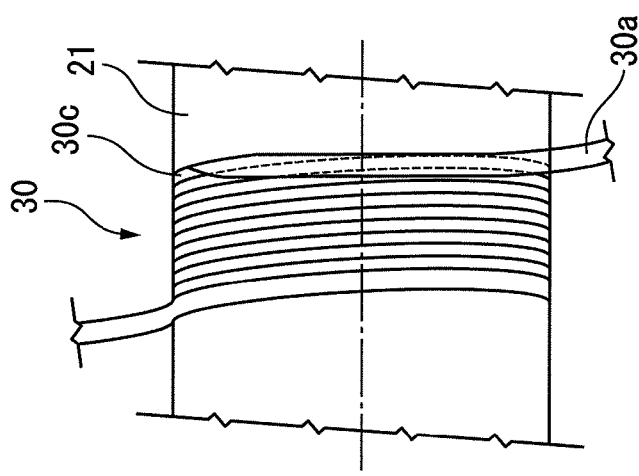

FIGS. 7a to 7c explain in detail another example of the terminal treatment for the winding start end of fiber bundle 30, in which the winding start end can be fixed more strongly than the example of FIGS. 6a to 6c. First, as shown in FIG. 7a, a portion 30a having certain length, which is not wound on forming jig 21, is previously withdrawn from the fiber bundle. Next, as shown in FIG. 7b, withdrawn portion 30a of the fiber bundle is folded along a previously wound axial edge portion 30c of fiber bundle 30 so that portion 30a is overlapped with edge portion 30c.

Then, withdrawn portion 30a is wound on edge portion 30c at the same axial position by one or more lap (preferably, by one lap), is withdrawn portion 30a is introduced under the former lap of the fiber bundle, and is folded along edge portion 30c so that portion 30a is overlapped with the former lap of the fiber bundle, so as to form an overlapped portion.

Finally, the overlapped portion between the position where the withdrawn portion is introduced and the position of the end of fiber bundle is bonded by using resin "A." In this regard, resin "A" may be applied to the overlapped portion during the withdrawn portion is introduced or the overlapped portion is formed, or, may be applied to or impregnated in the overlapped portion after the overlapped portion is formed. Actually, a portion other than the portion intended to be bonded may also be cured by resin "A," this causes no problem depending on the degree of curing. By the similar method, holding member 20 may be directly formed on permanent magnet 16.

FIGS. 8a to 8c explain in detail an example of the terminal treatment for winding terminal end 30b of fiber bundle 30. First, as shown in FIG. 8a, winding terminal end 30b is introduced under the former lap of the fiber bundle. Then, as shown in FIG. 8b, terminal end 30b is folded along an edge portion 30d of fiber bundle 30, so as to overlap with the former lap of the fiber bundle and form an overlapped portion. Finally, the overlapped portion between the position where terminal end 30b is introduced and the position of the end of fiber bundle is bonded by using resin "A."

In this regard, resin "A" may be applied to the overlapped portion during winding terminal end 30b is introduced or the overlapped portion is formed, or, may be applied to or impregnated in the overlapped portion after the overlapped portion is formed. Actually, a portion other than the portion intended to be bonded may also be cured by resin "A," this basically causes no problem depending on the degree of curing. By a similar method, holding member 20 may be directly formed on permanent magnet 16.

Fiber bundle as described above may be a flat tape, and may be spirally wound from one axial end to the other axial end, while being partially overlapped with the former lap in the width direction thereof. When fiber bundle 30 is constituted by a carbon fiber, fiber bundle 30 may be prepared as a tape member having the thickness of about 0.1 mm and the width of 3 mm to 10 mm, for example.

As described above, the several preferred examples of the terminal treatment of the ends of fiber bundle 30 are explained. In this regard, on a portion (or a section) of the fiber bundle other than the end portions where the terminal treatment by bonding is carried out, it is preferable to use a second resin (hereinafter, also referred to as a resin "B"), different from resin "A," as the matrix resin. The second resin is chip-proof and flexible, and has a high allowable elongation. The reason why the second resin should be used is described below.

As explained above, the tension is applied to the holding member in order to generate the holding for holding the magnets. The tension is given by the tightening margin arranged between sleeve 14 or 14b and rotating shaft 12. The diameter of the sleeve is expanded by the tightening margin, and then, magnets 16 positioned on the sleeve are radially outwardly moved, whereby holding member 20 is radially outwardly expanded. As a result, the tension in the circumferential direction is applied to holding member 20, and then the elastic restoring force is generated for holding magnets 16. In other words, one method for strongly holding magnets 16 is to largely expand holding member 20 so as to generate high tension. As magnets 16 are strongly held, the rotor can be rotated at high speed.

Generally, a resin having high bonding strength, such as resin "A," is hard and brittle. Normally, when tensile force is applied to such a resin, breaking elongation of the resin is relatively small. When such a resin is used as the matrix resin of holding member 20, the elongation of the resin may not follow the deformation (or the expansion of the diameter) of holding member 20, whereby the resin may get broken. In particular, when the resin makes a chemical binding with the fiber by reacting a functional group on the surface of the fiber during curing the resin, the fiber may also be broken due to cracking of the resin, by which holding member 20 may be critically damaged.

Therefore, for example, it is preferable that resin "B" used as the matrix resin have a glass-translation temperature Tg(B) lower than a glass-translation temperature of resin "A" (Tg(A)) (i.e., Tg(A)>Tg(B)). Generally, the higher the glass-translation temperature of the resin is, the higher bonding strength is obtained between normal temperature and high temperature, whereas the resin becomes hard and brittle.

Alternatively, regarding tensile shear adhesive strength, obtained when the fiber bundles are adhered to each other by the resin while aligning the fiber directions (or the longitudinal directions), it is preferable that the tensile shear adhesive strength of resin "B" (TSS(B)) is lower than the tensile shear adhesive strength of resin "A" (TSS(A)) (i.e., TSS(A)>TSS(B)). This is because, in order that the resin is not broken due to the elongation in the fiber direction, it is preferable that the resin be replaced from the fiber in the fiber direction, without being broken.

Alternatively, regarding Izod impact strength obtained by an Izod impact test, it is preferable that the Izod impact strength of resin "B" (II(B)) be higher than the Izod impact strength of resin "A" (II(A)) (i.e., II(A)<II(B)) or the Izod impact strength of resin "B" be unmeasurable since resin "B" is not destroyed in the Izod impact test. This is because, the higher Izod impact strength the resin has the resin is not likely to be broken (i.e., the resin is more ductile).

As a conventional resin corresponding to at least one of the above types of resin, an acrylic resin is preferable. In particular, in view of permeability of the resin into the fiber, the strength at high temperature and the flexibility after curing, it is preferable that a major component of the resin have an acrylic acid ester or methacrylate ester in a molecule thereof. In particular, the combination of the epoxy resin as resin "A" and the acrylic resin as resin "B" is preferable.

Alternatively, both resin "A" and "B" may be the epoxy resin. In this case, a preferable effect can be obtained when the types of resin "A" and "B" are selected so that one of the above conditions regarding the glass-translation temperature, the tensile shear adhesive strength and the Izod impact strength is satisfied.

As fiber bundle 30 as described above, the carbon fiber is particularly preferable. Since the specific strength (the strength per unit density) of the carbon fiber is relatively high, the carbon fiber is suitable for obtaining the high holding strength while limiting the centrifugal force at high rotation speed. Normally, a molecular structure of the surface of the carbon fiber has a functional group such as —CO—, C=O, or COOH, in order to improve binding ability with a reactive curable resin. Therefore, the bonding effect between resin "A" and the carbon fiber can be improved on the molecular level, in particular in the terminal treatment for the winding start end and the winding terminal end of the fiber bundle.

Figure 9:
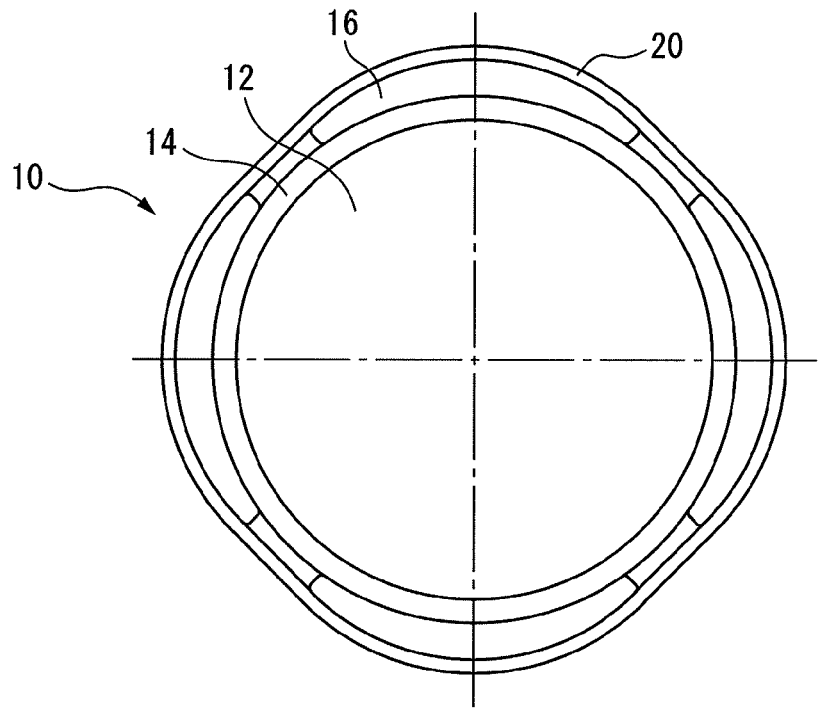
FIG. 9 is a schematic view showing a radial cross-section of the rotor according to an embodiment of the present invention, after assembling of the rotor is completed.

FIG. 9 shows a radial cross section of rotor 10 according to an embodiment of the present invention, after the rotor is assembled. As described above, the tension is applied to holding member 20, and magnets 16 are held in the radially-inward direction due to the elastic restoring force of holding member 20. Further, magnets 16 are strongly pressed and fixed to the outer peripheral surface of sleeve 14 by holding member 20.

Figure 10:
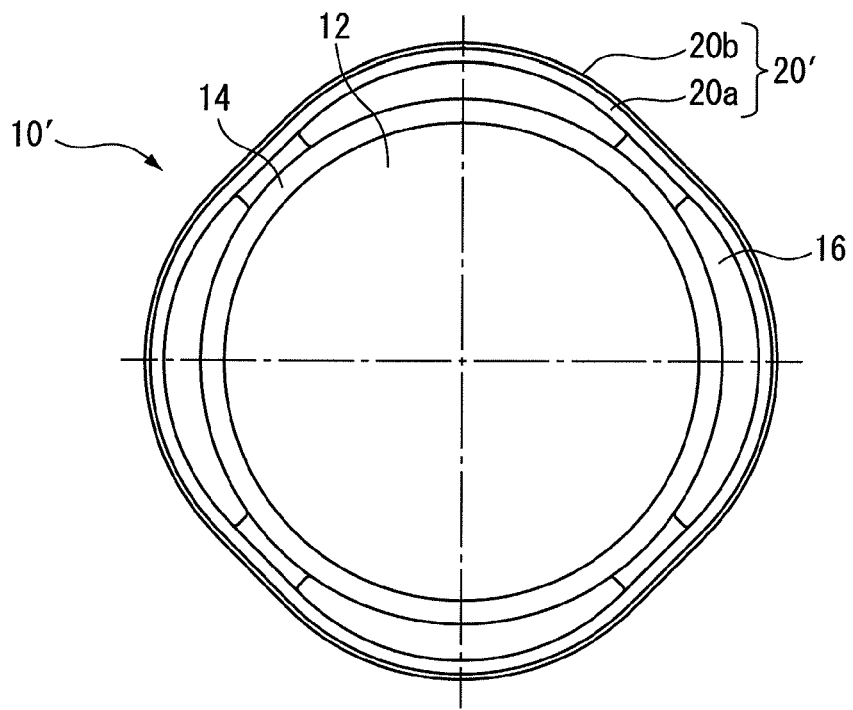
FIG. 10 is a schematic view showing a radial cross-section of the rotor according to another embodiment of the present invention, after assembling of the rotor is completed.

FIG. 10 shows a radial cross section of a rotor 10' according to another embodiment of the present invention, after the rotor is assembled. Rotor 10' is different from rotor 10 of FIG. 9 in that a magnet holding member 20' of rotor 10' has a double structure including two concentric members adjacent each other, and the other components of rotor 10' may be the same as rotor 10. Concretely, holding member 20' of rotor 10' has an inner holding member 20a and an outer holding member 20b.

Similarly to holding member 20 as described above, inner holding member 20a is formed by winding the fiber bundle. On the other hand, outer holding member 20b may also be formed by winding the fiber bundle similarly to holding member 20, whereas outer holding member 20b may be formed by different material or method. For example, as a material of outer holding member 20b, a non-magnetic metal or an FRP having a sufficient strength in the circumferential direction thereof is preferable. In this regard, since outer holding member 20b is used as a rotating body, a material having high specific strength (for example, an FRP such as a CFRP, or a light non-magnetic metal such as a titan alloy) is preferable. When the FRP is used as a material of outer holding member 20b, a fiber bundle of FRP may be wound so as to form the outer holding member, or a prepreg sheet of FRP may be wound on the jig and cured by heating so as to form the outer holding member.

When the non-magnetic metal such as the titan alloy is used as the material of outer holding member 20b, it is advantageous to use a preformed thin-walled pipe of the non-magnetic metal. Normally, when the non-magnetic metal is used as outer holding member 20b, an effect for protecting inner holding member 20a is higher than the case in which the FRP is used as the outer holding member.

The tightening margin of inner holding member 20a is larger than the tightening margin of outer holding member 20b. Due to such magnitude relationship, the tension applied to one fiber of inner holding member 20a is larger than that of outer holding member 20b. As a result, in outer holding member 20b, a risk of damage or peeling at the bonding portion due to the excess tension is reduced, whereby durability of the holding member is improved. On the other hand, the compressing force in the radially-inward direction by outer holding member 20b is applied to the outer peripheral surface of inner holding member 20a, whereby the fiber bundle constituting inner holding member 20 is not likely to be loosened. In particular, the winding start end and the winding terminal end, where the terminal treatment (or the tightening treatment) is carried out, are also pressed from the radially outside by outer holding member 20b, a risk of peeling or loosening of the start end or the terminal end due to wind pressure, etc., during the rotation, is reduced.

As a result, in the configuration of FIG. 10, holding member 20' is not likely to be loosened also in the long term. In other words, a reliable rotor can be provided, in which the holding strength for the magnets is not decreased also in the long term. Further, since the tightening margin of inner holding member 20a can be increased, the holding strength for the magnets can be increased, whereby the rotor can be rotated at high speed. Since a heavy magnet can be held due to increase in the magnet holding strength, the thickness of each magnet can be increased, whereby a performance of the rotating electrical machine (such as a torque or power) can be improved. Since the tightening margin of outer holding member 20b is smaller than that of inner holding member 20a, the flexibility of design of outer holding member 20b is greater than inner holding member 20a.

Preferably, in a manufacturing process of holding member 20a or 20b, a step of curing the resin is carried out more than once or at two or more portions. In this regard, although "more than once" refers to steps of curing resin "A" and "B," respectively, the step of curing each resin can be divided into a plurality of steps. On the other hand, although "two or more portions" refers to steps of applying and curing (heating) the same or different resin at the different portions, the steps may be carries out simultaneously or sequentially. When the steps are simultaneously carried out, the curing step is carried out substantially once.

When the magnets should be strongly held (for example, when the rotor is rotated at high speed), the compressive holding force generated by holding member 20 or 20' may be increased. In order to increase the compressive holding force, following three methods may be effective.

(1) Increasing the radial thickness of the holding member (2) Using a fiber having a high elastic modulus as a material of the holding member (3) Increasing the tightening margin between the sleeve and the rotation shaft so as to increase an amount of expansion of the diameter of the holding member In method (2) or (3), the compressive holding force is increased by increasing the tension per one fiber of the holding member, and thus the present invention for preventing the fiber from loosening is particularly effective in method (2) or (3). The present invention is also effective in method (1), in view of improvement in the reliability in the long term or a lifetime of the product.

In summary, the forming process of the above magnet holding member is described as below. First, when the cylindrical magnet holding member is previously formed by winding the fiber bundle on the forming jig and then the outer periphery of the magnet is covered by the holding member, the forming process includes following steps (i) to (iv).

(i) Winding the fiber bundle of at least one traverse on the jig (ii) Carrying out the terminal treatment of the winding start end and the winding terminal end of the fiber bundle (i.e., bonding the ends by resin "A" and curing resin "A")

(iii) Impregnating resin "B" into the section between the start end and the terminal end of the fiber bundle (iv) Removing the formed magnet holding member from the jig, after resin "B" is cured On the other hand, when the magnet holding member is directly formed on the outer periphery of the magnet, without using the jig, the forming process includes following steps (v) to (vii).

(v) Winding the fiber bundle of at least one traverse on the permanent magnets positioned on the sleeve (vi) Carrying out the terminal treatment of the winding start end and the winding terminal end of the fiber bundle (i.e., bonding the ends by resin "A" and curing resin "A")

(vii) Impregnating resin "B" into the section between the start end and the terminal end of the fiber bundle, and curing resin "B"

Rotor 10 having holding member 20 according to the present invention can be rotated at high speed, and thus a compact and high-power rotating electrical machine 100 can be obtained by providing rotor 10 to rotating electrical machine 100. When rotating electrical machine 100 is applied to a spindle 103 of a machine tool 101 (see FIG. 1), extremely high-performance machine tool 100 can be obtained. This tendency is remarkable when a neodymium magnet having high magnetic force is used as magnet 16.

According to the present invention, the holding member is not peeled or loosened when being rotated, and thus the reliability and strength in the long term can be improved. Since the holding strength for compressively holding the magnets of the rotor in the radially-inward direction can be increased, the maximum speed of the rotor can be increased without deteriorating the reliability of the rotor. As a result, the output power of the rotating electrical machine having the rotor can be increased. When the output power is increased, the performance of the machine tool having the rotating electrical machine can be improved, whereby machining ability and production capacity of the machine tool can be improved.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A holding member used in a rotating electrical machine having a rotor including a rotating shaft, a sleeve fitted with an outer periphery of the rotating shaft by interference fit between tapered surfaces, and a plurality of magnets positioned on an outer peripheral surface of the sleeve,
the holding member being positioned radially outside of the magnets and configured to radially inwardly press and hold the magnets, wherein
the holding member comprises a cylindrical shape formed by spirally winding a fiber bundle on the outer periphery of the magnet, which is unbroken over at least one traverse, from one axial end to the other axial end of the rotor outside the outer periphery of the rotor, the one traverse at least including a section where the magnets are positioned, among sections between the one axial end the other axial end of the rotor, wherein the holding member is formed by a fiber reinforced resin including a resin as a matrix, and a termination treatment of at least a winding start end and
a winding terminal end of the fiber bundle is carried out by using a first resin which is a reactive curable resin, and wherein
a second resin different from the first resin is used in a section between a terminal treatment part of the winding start end and a terminal treatment part of the winding terminal end.

2. The holding member as set forth in claim 1, wherein the holding member is formed by carrying out a plurality of winding operations, each winding operation winding the fiber bundle corresponding to the one traverse.

3. The holding member as set forth in claim 2, wherein the winding start end and the winding terminal end of the unbroken fiber bundle are positioned on the same side of the rotor in an axial direction thereof, and the termination treatment of the start end and the terminal end is carried out by adhering the start end and the terminal end by using the first resin.

4. The holding member as set forth in claim 1, wherein the fiber bundle is formed as a flat tape.

5. The holding member as set forth in claim 1, wherein a glass-translation temperature of the second resin is lower than a glass-translation temperature of the first resin.

6. The holding member as set forth in claim 1, wherein tensile shear adhesive strength of the second resin, obtained when the fiber bundles are adhered to each other by the second resin, is lower than that of the first resin.

7. The holding member as set forth in claim 1, wherein Izod impact strength of the second resin is higher than Izod impact strength of the first resin or the Izod impact strength of the second resin is unmeasurable since the second resin is not destroyed in an Izod impact test.

8. The holding member as set forth in claim 1, wherein the first resin is an epoxy resin, the second resin is an acrylic resin, and the fiber bundle includes a carbon fiber.

9. A rotor comprising the holding member as set forth in claim 1, wherein tension is applied to the holding member in a circumferential direction of the rotor, and radially-inward elastic compressive force is applied to the magnets due to the tension.

10. The rotor as set forth in claim 9, wherein a separate member having a cylindrical shape is positioned on the outer peripheral of the holding member in a concentric pattern, wherein tension is applied to the separate member in a circumferential direction of the separate member, and radially-inward elastic compressive force is applied to the holding member due to the tension applied to the separate member, and wherein a tightening margin of the holding member is larger than a tightening margin of the separate member.

11. A rotating electrical machine comprising the rotor as set forth in claim 9.

12. A machine tool comprising the rotating electrical machine as set forth in claim 11.

* * * * *